United States Patent
Hu et al.

(10) Patent No.: US 12,081,054 B2
(45) Date of Patent: Sep. 3, 2024

(54) BIDIRECTIONAL PORTABLE ENERGY STORAGE POWER SUPPLY WITHOUT ADAPTER

(71) Applicant: Shenzhen SYD Network Technology Co., Ltd., Shenzhen (CN)

(72) Inventors: Han Hu, Shenzhen (CN); Xinkai Chen, Shenzhen (CN); Haining Liang, Shenzhen (CN); Sheng Long, Shenzhen (CN)

(73) Assignee: SHENZHEN SYD NETWORK TECHNOLOGY CO., LTD., Shenzhen (CN)

( * ) Notice: Subject to any disclaimer, the term of this patent is extended or adjusted under 35 U.S.C. 154(b) by 546 days.

(21) Appl. No.: 17/518,527

(22) Filed: Nov. 3, 2021

(65) Prior Publication Data
US 2022/0320884 A1 Oct. 6, 2022

(30) Foreign Application Priority Data
Mar. 31, 2021 (CN) .......................... 202120656901.1

(51) Int. Cl.
*H02J 7/00* (2006.01)
*H02M 3/335* (2006.01)

(52) U.S. Cl.
CPC ....... *H02J 7/0069* (2020.01); *H02M 3/33573* (2021.05); *H02M 3/33576* (2013.01)

(58) Field of Classification Search
CPC ............. H02J 7/0069; H02M 3/33573; H02M 3/33576
See application file for complete search history.

(56) References Cited

U.S. PATENT DOCUMENTS

2002/0140403 A1* 10/2002 Reddy ..................... H02J 9/062
320/162

* cited by examiner

*Primary Examiner* — Robert Grant (57) ABSTRACT

A bidirectional portable energy storage power supply without an adapter includes an energy storage unit, a first full bridge circuit, a resonant network, a second full bridge circuit, a third full bridge circuit and a charging and discharging interface circuit connected in turn. Each of the first full bridge circuit, the second full bridge circuit and the third full bridge circuit can be used as an inverter circuit or a rectification circuit, the charging and discharging interface circuit switchably connected with a mains network and a workload, the resonant network combined with the first full bridge circuit or the second full bridge circuit to implement soft-switching. The present disclosure can implement to bidirectionally charge and discharge the portable energy storage power supply by omitting an external adapter thereof, to improve a charging and discharging conversion efficiency, shorten a charging time and reduce a volume of power supply.

19 Claims, 3 Drawing Sheets

BIDIRECTIONAL PORTABLE ENERGY STORAGE POWER SUPPLY WITHOUT ADAPTER

TECHNICAL FIELD

The present disclosure generally relates to the technical field of power supply, and especially relates to a bidirectional portable energy storage power supply without an adapter.

DESCRIPTION OF RELATED ART

Portable energy storage power supplies are widely used in various application scenarios such as a home emergency power backup, an outdoor travel, an emergency relief, a field work or as a power supply of electric vehicles because it can store electric energy and supply the stored electric energy to electrical equipments.

At present, an external adapter is provided in the portable energy storage power supply on the market for charging the portable energy storage power supply. However, a charging mode by using the external adapter has the following disadvantages:

firstly, as a power and a volume of the portable energy storage power supply become larger and larger, the volume and a weight of the external adapter also become larger and larger, which results in inconveniently carrying the portable energy storage power supply;

secondly, a charging speed for charging the portable energy storage power supply is limited by the power of the external adapter, at present, a charging time for charging the portable energy storage power supply with a capacity below 500 WH is as long as 5~6 hours, and a charging time for charging the portable energy storage power supply with a capacity above 500 WH is more than 8 hours, so that a waiting time for charging the portable energy storage power supply is too long and the user experience is poor;

thirdly, a charging conversion efficiency of the portable energy storage power supply with the external adapter is generally very low generally, the conversion efficiency of an AC-DC adapter is about 85%, and the conversion efficiency of a charging DC-DC circuit, within the portable energy storage power supply is about 90%, therefore, an actual comprehensive conversion efficiency of the portable energy storage power supply is only about 77%, which leads to serious waste of electric energy not to be conducive to environmental protection and energy conservation.

Therefore, the conventional bidirectional portable energy storage power supply needs to be developed to overcome the problems above mentioned.

SUMMARY

The technical problems to be solved: in view of the shortcomings of the related art, the present disclosure provides a bidirectional portable energy storage power supply without an adapter which can implement to bidirectionally charge and discharge the portable energy storage power supply by omitting the external adapter thereof, so as to improve a conversion efficiency of charging and discharging the power supply, shorten a charging time and reduce a volume of the power supply.

The technical solution adopted for solving technical problems of the present disclosure is:

a bidirectional portable energy storage power supply without an adapter according to an embodiment of the present disclosure includes an energy storage unit, a first full bridge circuit, a resonant network, a second full bridge circuit, a third full bridge circuit and a charging and discharging interface circuit connected in turn;

each of the first full bridge circuit, the second full bridge circuit and the third full bridge circuit configured to be used as an inverter circuit or a rectification circuit, and the charging and discharging interface circuit switchably connected with a mains network and a workload;

when the energy storage unit is discharged, the first full bridge circuit is combined with the resonant network for implementing soft-switching, to be configured to invert a low-voltage direct current (DC) of the energy storage unit into a high-frequency low-voltage alternating current (AC), and boost the high-frequency low-voltage AC into a high-voltage AC through the resonant network, and then transmit the high-voltage AC to the second full bridge circuit; the second full bridge circuit configured to rectify the high-voltage AC into a high-voltage DC, the third full bridge circuit configured to invert the high-voltage DC into a power-frequency standard voltage AC and then output the power-frequency standard voltage AC from the charging and discharging interface circuit to the workload; and when the energy storage unit is charged, the mains network inputs the power-frequency standard voltage AC from the charging and discharging interface circuit, the third full bridge circuit configured to rectify the power-frequency standard voltage AC input from the mains network into the high-voltage DC, the second full bridge circuit combined with the resonant network for implement soft-switching, to be configured to invert the high-voltage DC into a high-frequency high-voltage AC, depressurize the high-frequency high-voltage AC into the low-voltage AC through the resonant network and transmit the low-voltage AC to the first full bridge circuit, the first full bridge circuit configured to rectify the low-voltage AC into the low-voltage DC, and the low-voltage DC input to the energy storage unit for charging the energy storage unit.

Wherein when the energy storage unit is discharged, a voltage of the power-frequency standard voltage AC is 110V or 220V after the third full bridge circuit has inverted the high-voltage DC into the power-frequency standard voltage AC.

Wherein when the energy storage unit is discharged, a frequency of the power-frequency standard voltage AC is 50 Hz or 60 Hz after the third full bridge circuit has inverted the high-voltage DC into the power-frequency standard voltage AC.

Wherein when the energy storage unit is charged, the third full bridge circuit is configured to rectify and boost the power-frequency standard voltage AC, with a voltage of 110V/220V and a frequency of 50 Hz/60 Hz, into the high-voltage DC, and then convert the high-voltage DC into the low-voltage DC through the second full bridge circuit, the resonant network and the first full bridge circuit, to charge the energy storage unit.

Wherein the energy storage unit is a battery and/or a battery pack.

Wherein each of the first full bridge circuit, the second full bridge circuit and the third full bridge circuit is composed of a plurality of switch tubes.

Wherein the resonance network includes a transformer T1 and a resonance circuit, a low-voltage side of the transformer T1 connected with the first full bridge circuit, a high-voltage side of the transformer T1 connected with the resonance circuit, and the resonance circuit also connected with the second full bridge circuit.

Wherein the resonant circuit includes a first inductor L1 and a first capacitor C1 a first end of the first inductor L1 connected with the high-voltage side of the transformer T1, a first end of the first capacitor C1 connected with the high-voltage side of the transformer T1 and connected in series with the first inductor L1, and both a second end of the first inductor L1 and a second end of the first capacitor C1 connected with the second full bridge circuit.

Wherein a third capacitor C3 is connected in parallel between the second full bridge circuit, and the third full bridge circuit.

Wherein the first full bridge circuit includes a first switch tube Q1, a second switch tube Q2, a third switch tube Q3 and a fourth switch tube Q4, the drain D of the first switch tube Q1 connected with a first end of the energy storage unit, the drain D of the second switch tube Q2 connected with the source S of the first switch tube Q1, and the source S of the second switch tube Q2 connected with a second end of the energy storage unit, the drain D of the third switch tube Q3 connected with the drain D of the first switch tube Q1, the source S of the third switch tube Q3 connected with the drain D of the fourth switch tube Q4, the source S of the second switch tube Q2 connected through the source S of the fourth switch tube Q4, the low-voltage side of the transformer T1 connected with a circuit between the first switch tube Q1 and the second switch tube Q2, and a circuit of the third switch tube Q3 and the fourth switch tube Q4, respectively.

Wherein the second full bridge circuit includes a fifth switch tube Q5, a sixth switch tube Q6, a seventh switch tube Q7 and an eighth switch tube Q8, the source S of the fifth switch tube Q5 connected with the second end of the first inductor L1, and the drain D of the sixth switch tube Q6 connected with the source S of the fifth switch tube Q5 and the second end of the first inductor L1 respectively, the drain D of the fifth switch tube Q5 connected with the drain D of the seventh switch tube Q7, the source S of the sixth switch tube Q6 connected with the source S of the eighth switch tube Q8, and the source S of the seventh switch tube Q7 connected with the drain D of the eighth switch tube Q8 and the second end of the first capacitor C1.

Wherein the third full bridge circuit includes a ninth switch tube Q9, a tenth switch tube Q10, an eleventh switch tube Q11 and a twelfth switch tube Q12, the drain D of the ninth switch tube Q9 connected with the drain D of the seventh switch tube Q7 and the drain D of the eleventh switch tube Q11 respectively, the source S of the tenth switch tube Q10 connected with the source S of the eighth switch tube Q8 and the source S of the twelfth switch tube Q12 respectively, the source S of the ninth switch tube Q9 connected with the drain D of the tenth switch tube Q10, and the source S of the eleventh switch tube Q11 connected with the drain D of the twelfth switch tube Q12.

Wherein the charging and discharging interface circuit includes a second inductor L2, a third inductor L3, a second capacitor C2, an input-output switch, a charging input AC_IN, a discharging output AC_OUT, and a ground AC_N; a first end of the second inductor L2 connected with a circuit between the ninth switch tube Q9 and the tenth switch tube Q10, a second end of the second inductor L2 connected with the input-output switch, and the input-output switching switch also connected with the charging input AC_IN and the discharging output AC_OUT for switching between a charge state and a discharge state, a first end of the third inductor L3 connected with a circuit between the eleventh switch tube Q11 and the twelfth switch tube Q12, and a second end of the third inductor L3 connected with the ground AC_N; a first end of the second capacitor C2 connected with the second end of the second inductor L2, and a second end of the second capacitor C2 connected with the second end of the third inductor L3.

Wherein the input-output switch includes a first switch JK1B and a second switch JK2B, the second end of the second inductance L2 connected with a first end of the first switch JK1B and a first end of the second switch JK2B, and a second end of the first switch JK1B connected with the charging input AC_IN, and a second end of the second switch JK2B connected with the discharging output AC_OUT.

Wherein when the first switch JK1B is closed and the second switch JK2B is disconnected, the energy storage power supply is configured to be as a charging mode;
when the first switch JK1B is disconnected and the second switch. JK2B is closed, the energy storage power supply is configured to be as a discharge mode; and
when both the first switch JK1B and the second switch JK2B are closed, the energy storage power supply is configured to be as charging and discharging mode.

Wherein both the first switch JK and the second switch JK2B are automatically and/or manually switched.

Wherein the first switch JK1B and the second switch JK2B are connected with a relay that is automatically switched.

Wherein the bidirectional portable energy storage power supply is configured as a UPS power supply by automatically switching the first switch JK and the second switch JK2B.

Wherein the bidirectional portable energy storage power supply further includes a controller connected with the grid of each switch tube of the first full bridge circuit, the second full bridge circuit and the third full bridge circuit.

It can be understood that, within the scope of the present disclosure, the above technical features of the present disclosure and the technical features specifically described below (such as an embodiment) can be combined with each other to for n a new or preferred technical scheme, which will not be repeatedly described here due to be limited to spaces.

The present disclosure provides the energy storage unit, the first full bridge circuit, the resonant network, the second full bridge circuit, the third full bridge circuit and the charging and discharging interface circuit connected in turn, in this way, the charging and discharging, interface circuit can be directly connected with the power-frequency high-voltage AC input from the mains network without the external adapter, and then the high-voltage AC is converted into the low-voltage DC and input into the energy storage unit for storage by performing a process of rectification-inverter and re-rectification through the third full bridge circuit, the second full bridge circuit, the resonance network and the first full bridge circuit; while, the discharge process is an reverse process of the above process: the low-voltage DC of the energy storage unit is inverted, rectified and then again inverted to output the same power-frequency high-voltage AC of the mains network, so as to adapt for the power supply of a common equipment. Because the external adapter is not needed in the present disclosure, the volume of the power supply can be minimized. At the same time, because the resonant network is combined with the first full bridge circuit or the second full bridge circuit to implement soft-switching, switching loss in the charging and discharging process can be reduced so as to improve the electric energy conversion efficiency. Furthermore, the present disclosure provides the same circuit for charging and discharging the power supply, so that a charging power can be the same as a discharging power, thereby the power supply can be charged quickly due to have the charging power with several times larger than the charging power of the conventional external adapter.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

The element labels according to the embodiment of the present disclosure shown as below:

energy storage power supply 100, energy storage unit 10, first, full bridge circuit 20, resonant network 30, resonant circuit 31, second full bridge circuit 40, third full bridge circuit 50, charging and discharging interface circuit 60, input-output switch 61, mains network 200, workload 300, transformer T1, first inductor L1, second inductor L2, third inductor L3, first capacitor C1, second capacitor C2, third capacitor C3, first switch tube Q1, second switch tube Q2, third switch tube Q3, fourth switch tube Q4, fifth switch tube Q5, sixth switch tube Q6, seventh switch tube Q7, eighth switch tube Q8, ninth switch tube Q9, tenth switch tube Q10, eleventh switch tube Q11, twelfth switch tube Q12 drain D, source S, charging input AC_IN, discharging output AC_OUT, ground AC_N, first switch JK1B, second switch JK2B.

DETAILED DESCRIPTION

Reference will now be made in detail to embodiments, examples of which are illustrated in the accompanying drawings. In the following detailed description, numerous specific details are set forth, in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

In the description of the present disclosure, it needs to be explained that all the directional indicators (such as the terms: "upper", "below", "left", "right", "front", "back" . . . ), are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms illustrated in the detail description are not by way of the limitation of the present disclosure.

In the description of the present disclosure, except where specifically otherwise illustrated or limited, the terms "connect" and "link" used herein should be understood in a broad sense. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure.

Furthermore, in the description of the present disclosure, the terms such as "first" and "second" shown in the specification are only used to describe, but not indicated that the elements of the present disclosure is important or represented the amount of the elements. That is, the features limited by the terms of "first" and "second" may explicitly or implicitly include one or more features.

Figure 1:
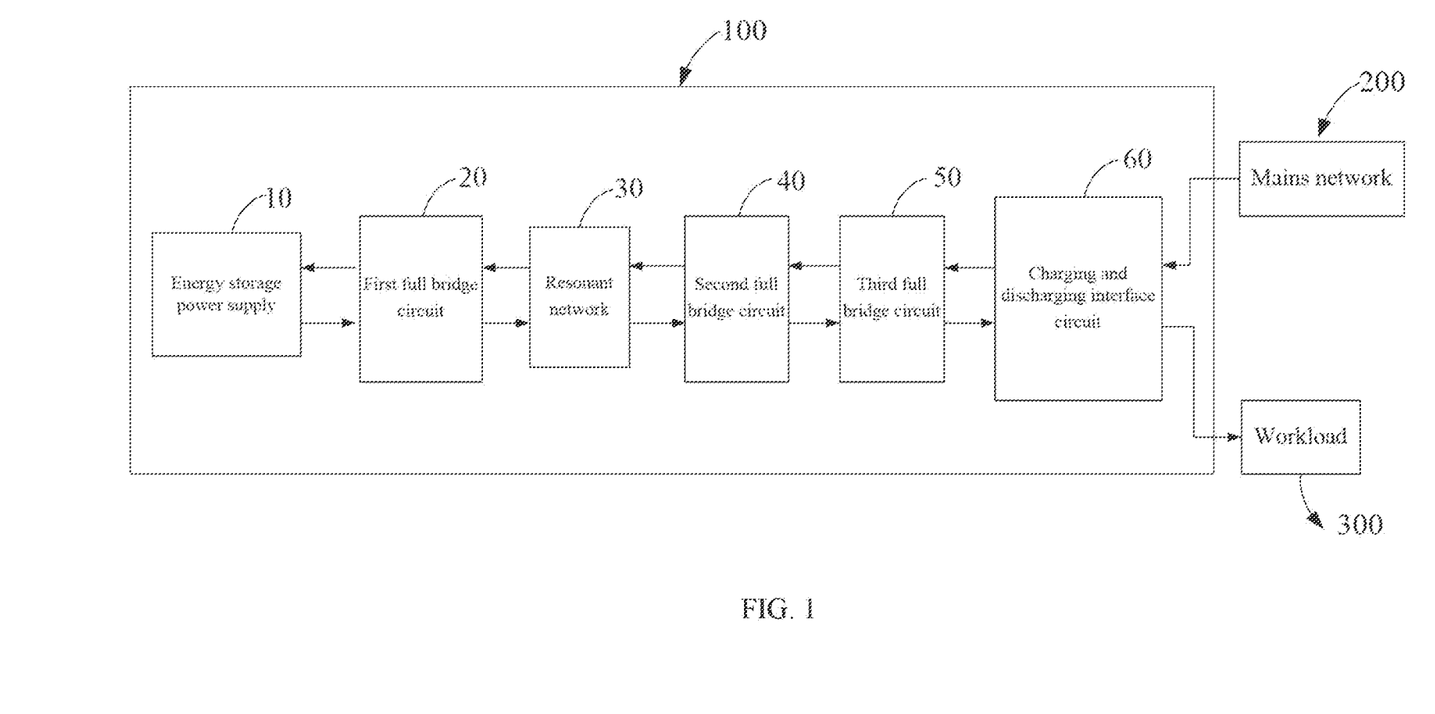
FIG. 1 is a schematic view of a bidirectional portable energy storage power supply without an adapter in accordance with a first embodiment of the present disclosure.

Referring to FIG. 1, a bidirectional portable energy storage power supply 100 without an adapter in accordance with an embodiment of the present disclosure includes an energy storage unit 10, a first full bridge circuit 20, a resonant network 30, a second full bridge circuit 40, a third full bridge circuit 50 and a charging and discharging interface circuit 60 connected in turn. In an embodiment of the present disclosure, the energy storage unit 10 is a battery and/or a battery pack, for example, the energy storage unit 10 is a battery pack with a 48V DC.

Each of the first full bridge circuit 30, the second full bridge circuit 40 and the third full bridge circuit 50 is configured to be used as an inverter circuit or a rectification circuit. That is, each of the first full bridge circuit 20, the second full bridge circuit 40 and the third full bridge circuit 50 of the present disclosure can be configured to invert and rectify the current of the power supply 100, so as to implement two-way uses, i.e. charging and discharging the power supply 100. Each of the first full bridge circuit 20, the second full bridge circuit 40 and the third full bridge circuit 50 is composed of a plurality of switch tubes. The charging and discharging interface circuit 60 is configured to be switchably connected with a mains network 200 and a workload 300.

Specifically, when the energy storage unit 10 is discharged, the first full bridge circuit 20 is combined with the resonant network 30 for implementing soft-switching to be configured to invert a low-voltage direct current (DC) of the energy storage unit into a high-frequency low-voltage alternating current (AC), and boost the high-frequency low-voltage AC into a high-voltage AC through the resonant network 30, and then transmit the high-voltage AC to the second full bridge circuit 40. The second full bridge circuit 40 is configured to rectify the high-voltage AC into a high-voltage DC, the third full bridge circuit 50 configured to invert the high-voltage DC into a power-frequency standard voltage AC, and then output the power-frequency standard voltage AC from the charging and discharging interface circuit 60 to the workload 300.

A combination of the resonant network 30 and the first, second and third full bridge circuits 20, 40, 50 of the present disclosure has a characteristics of an LLC soft-switching, when the first full bridge circuit 20 and the second full bridge circuit 40 are inverted, the soft-switching instead of hard-switching is performed to reduce losses in a high-speed switching process of the first full bridge circuit 20 and the second full bridge circuit 40, to further improve the power conversion efficiency of the entire portable energy storage power supply 100.

In an embodiment of the present disclosure, when the energy storage unit 10 is discharged, a voltage of the power-frequency standard Voltage AC is 110V or 220V after the third full bridge circuit 50 inverts the high-voltage DC into the power-frequency standard voltage AC. The voltage of the power-frequency standard voltage AC is 110V or 220V and output from the charging and discharging interface circuit 60 to the workload 300 to meet the power supply of a common standard working voltage of electrical equipments. Furthermore, the voltage of the power-frequency standard voltage AC is controlled when the resonant network 30 performs high-low voltage conversions, for example, controlling the number of turns of a mutual inductance coil of a transformer in the resonant network 30.

It can be understood that the voltage of the power-frequency standard voltage AC can also be other standard working voltages, such as 120V, 230V, 240V, 250V and 380V, etc., after the third full bridge circuit 50 inverts the high-voltage DC into the power-frequency standard voltage AC, so as to be applicable to power consumption voltage standards of different countries.

In an embodiment of the present disclosure, when the energy storage unit 10 is discharged, a frequency of the power-frequency standard voltage AC is 50 Hz or 60 Hz after the third full bridge circuit 50 inverts the high-voltage DC into the power-frequency standard voltage AC. An output frequency of the power-frequency standard voltage AC can be 50 Hz or 60 Hz, so as to meet the power supply of electrical equipments with a common standard working frequency. Furthermore, the frequency of the power-frequency standard voltage AC is controlled when the third full bridge circuit 50 is inverted.

It can be understood that the frequency of the power-frequency standard voltage AC can be other standard operating frequencies after the third full bridge circuit 50 inverts the high-voltage DC into the power-frequency standard voltage AC.

In an embodiment of the present disclosure, when the energy storage unit 10 is charged, the third full bridge circuit 50 is configured to rectify and boost the power-frequency standard voltage AC, with a voltage of 110V/220V and a frequency of 50 Hz/60 Hz, into the high-voltage DC, and then convert the high-voltage DC into the low-voltage DC through the second full bridge circuit 40, the resonant network 30 and the first full bridge circuit 20, so as to charge the energy storage unit 10.

The portable energy storage power supply 100 of the present disclosure directly converts the electric energy that is stored in the energy storage unit 10 into the power-frequency standard voltage AC without an, additional converter, to meet most of daily electrical appliances, and improve conveniences of usage. A discharge process of the portable energy storage power supply 100 of the present disclosure is the process of outputting the power-frequency standard voltage AC after the low-voltage DC of the energy storage unit 10 is inverted, rectified and then again inverted.

The portable energy storage power supply 100 of the present disclosure is charged and discharged by using the same circuit, and the charging conversion process is opposite to the discharging process, that is, the power-frequency standard voltage AC input by the mains network 200 passes through the process of rectification, inversion and re-rectification, specifically, when the energy storage unit 10 is charged, the mains network 200 inputs the power-frequency standard voltage AC from the charging and discharging interface circuit 60, the third full bridge circuit 50 is configured to rectify the power-frequency standard voltage AC input from the mains network 200 into the high-voltage DC, the second full bridge circuit 40 is combined with the resonant network 300 for implement, soft-switching, to be configured to invert the high-voltage DC into a high-frequency high-voltage AC, depressurize the high-frequency high-voltage AC into the low-voltage AC through the resonant network 300 and transmit the low-voltage AC to the first full bridge circuit 20, the first full bridge circuit 20 is configured to rectify the low-voltage AC into the low-voltage DC, and the low-voltage DC input to the energy storage unit 10 for storage.

It can be seen that the portable energy storage power supply 100 of the present disclosure without needing an external adapter during charging the portable energy storage power supply 100, so the volume of the power supply can be reduced, at the same time, the LLC soft-switching is occurred in the portable energy storage power supply 100, the switching loss in the charging process of the portable energy storage power supply 100 can be reduced and the power conversion efficiency can be improved. Furthermore, the present disclosure provides the same circuit for charging and discharging the power supply 100, so that a charging power can be the same as a discharging power, thereby the power supply 100 can be charged quickly and the charging waiting time can also be greatly reduced due to have the charging power with several times larger than the charging power of the conventional external adapter.

The DC of the energy storage unit 10 can be inverted into the high-frequency AC during discharging the portable energy storage power supply 100 of the present disclosure by using the first full bridge circuit 20, and the second full bridge circuit 40 is used to reverse the DC into the high-frequency AC during charging portable energy storage power supply 100, in this way, the conversion efficiency of the power supply 100 can be improved by using high-frequency energy conversion.

Figure 2:
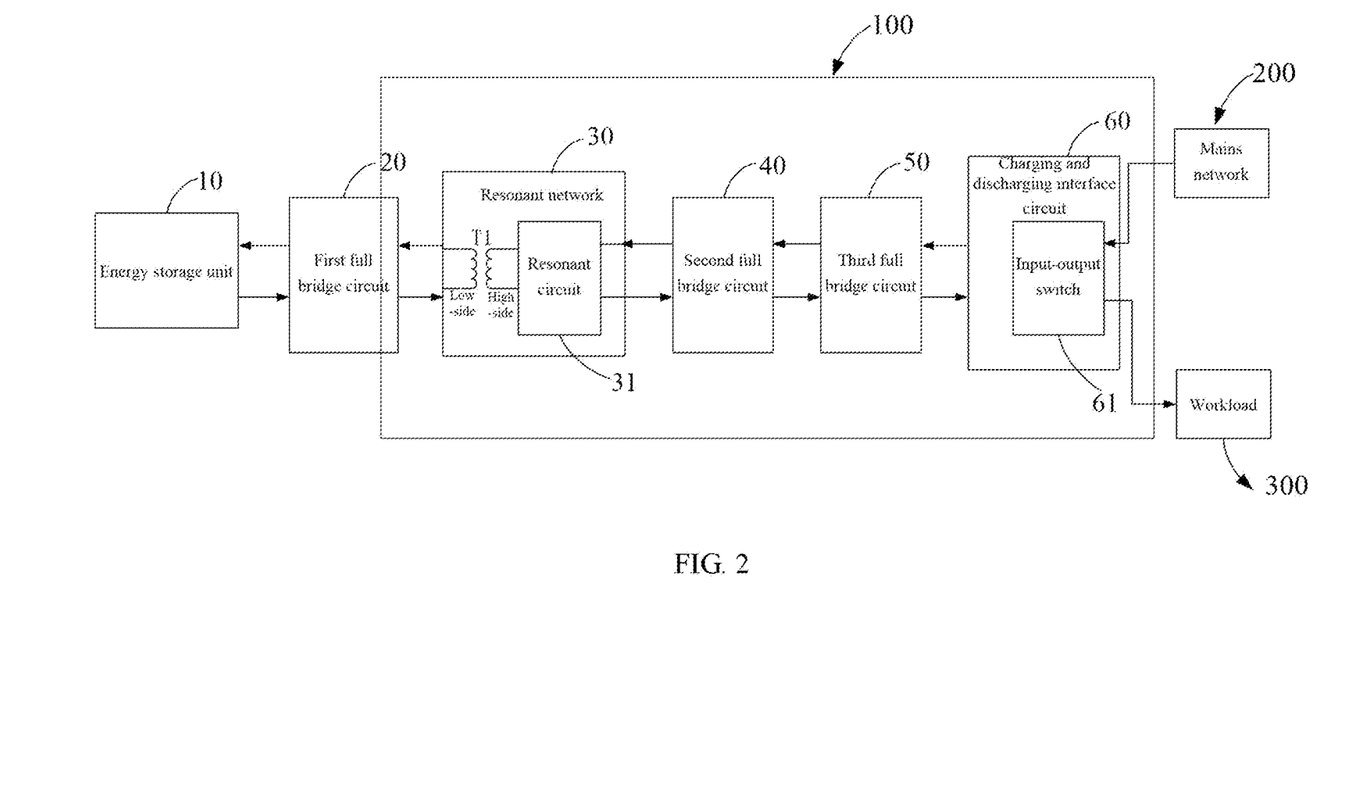
FIG. 2 is a schematic view of a bidirectional portable energy storage power supply without an adapter in accordance with a second embodiment of the present disclosure.

Referring to FIG. 2, the resonance network 300 includes a transformer T1 and a resonance circuit 31, a low-voltage side of the transformer 11 connected with the first full bridge circuit 20, a high-voltage side of the transformer T1 connected with the resonance circuit 31, and the resonance circuit 31 also connected with the second full bridge circuit 40. The transformer T1 and the resonant circuit 31 are cooperative together to form a soft-switching. In the discharging process of the portable energy storage power supply 100, when the first full bridge circuit 20 inverts the DC output by the energy storage unit 10, both the transformer T1 and the resonant circuit 31 perform soft-switching control on the switch tubes of the first full bridge circuit 20. In the charging process of the portable energy storage power supply 100, when the second full bridge circuit 40 inverts the DC output by the third full bridge circuit 50, both the transformer T1 and the resonant circuit 31 perform the soft-switching control on the switch tubes of the second full bridge circuit 40. The transformer T1 has a function of isolating a high voltage and a low voltage at the same time.

In the description of the present disclosure, a description of a first end of an element corresponds to a mark 1 of the position of the element in the figures, and a description of a second end of the element corresponds to a mark 2 of the position of the element in the figures.

Figure 3:
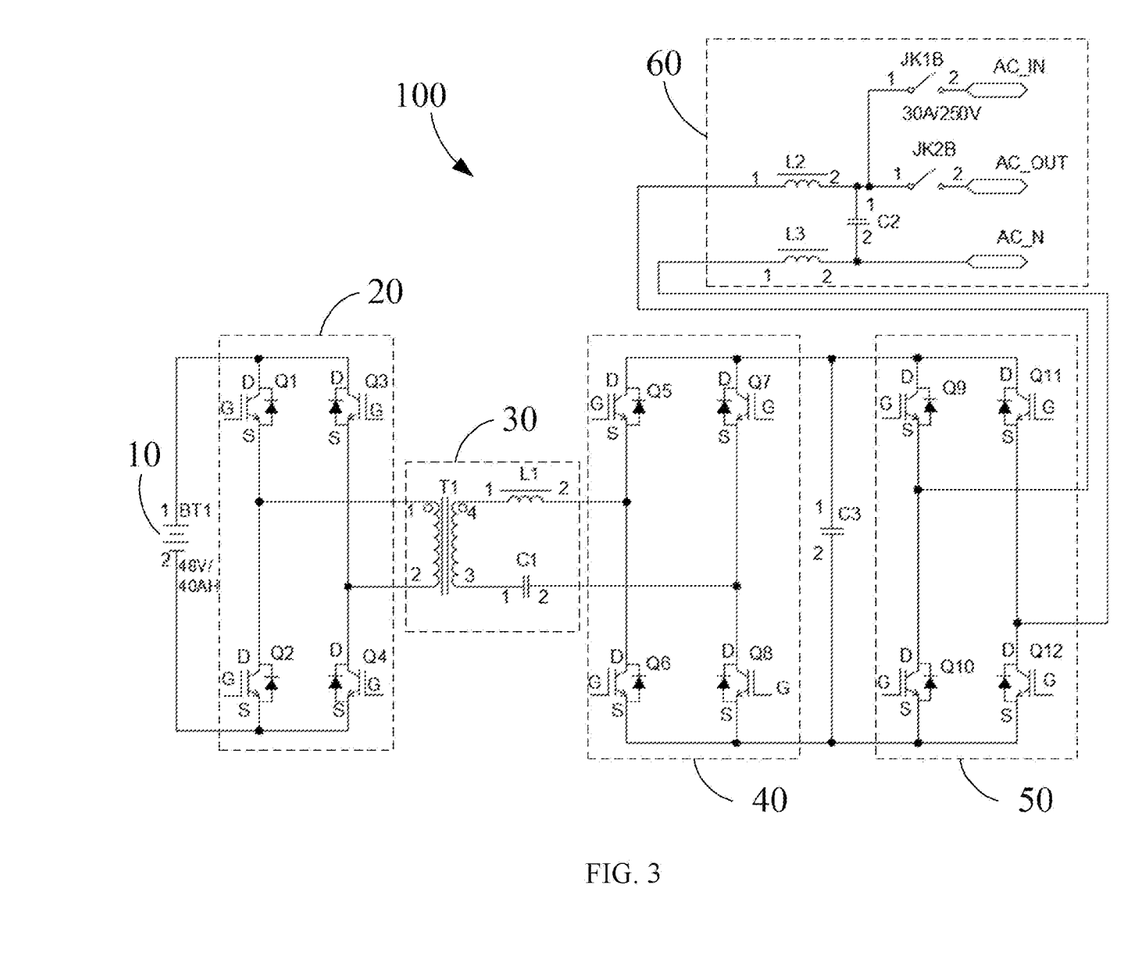
FIG. 3 is a circuit connection diagram of the bidirectional portable energy storage power supply without the adapter of the present disclosure.

Specifically, referring to FIG. 3, the resonant circuit 31 includes a first inductor L1 and a first capacitor C1, a first end of the first inductor L1 connected with the high-voltage side of the transformer T1, a first end of the first capacitor C1 connected with the high-voltage side of the transformer T1 and connected in series with the first inductor L1, and both a second end of the first inductor L1 and a second end of the first capacitor C1 connected with the second full bridge circuit 40. In the present disclosure, pins 1, 2 of the transformer T1 are taken as the low-voltage side, and pins 3, 4 of the transformer T1 are taken as the high-voltage side. The first inductance L1 and the first capacitance C1 of the resonant circuit 31 are connected in series. It can be understood that, in other embodiments, the resonant circuit 31 can also be arranged on the low-voltage side of the transformer T1, or the resonant circuit 31 can be arranged on both the low-voltage side and the high-voltage side of the transformer T1.

Preferably, a third capacitor C3 is connected in parallel between the second full bridge circuit 40 and the third full bridge circuit 50. The third capacitor C3 is connected with two full bridge circuits and has functions of energy absorption, impact resistance and compensation, and can be adopted for a high-voltage DC bus capacitor.

Specifically, referring to FIG. 3, the first full bridge circuit 20 includes a first switch tube Q1, a second switch tube Q2, a third switch tube Q3 and a fourth switch tube Q4. The drain of the first switch tube Q1 is connected with a first end of the energy storage unit 10, the drain D of the second switch tube Q2 connected with the source S of the first switch tube Q1, and the source S of the second switch tube Q2 connected with a second end of the energy storage unit 10, the drain D of the third switch tube Q3 connected with the drain D of the first switch tube Q1 the source S of the third switch tube Q3 connected with the drain D of the fourth switch tube Q4, the source S of the second switch tube Q2 connected through the source S of the fourth switch tube Q4, the low-voltage side of the transformer T1 connected with a circuit between the first switch tube Q1 and the second switch tube Q2, and a circuit of the third switch tube Q3 and the fourth switch tube Q4, respectively. In the discharging process, all the first switch tube Q1 the second switch tube Q2, the third switch tube Q3 and the fourth switch tube Q4 are controlled to be turned on or turned off for implementing to invert the currents of the portable energy storage power supply 100. While, in the charging process, all the first switch tube Q1, the second switch tube Q2, the third switch tube Q3 and the fourth switch tube Q4 are controlled to be turned on or turned off for implementing to rectify the currents of the portable energy storage power supply 100. When the energy storage unit 10 is discharged, a resonant frequency of the first inductor L1 and the first capacitor C1 controls switching frequencies of the first switch tube Q1, the second switch tube Q2, the third switch tube Q3 and the fourth switch tube Q4 for implementing the soft-switching.

The second full bridge circuit 40 includes a fifth switch tube Q5, a sixth switch tube Q6, a seventh switch tube Q7 and an eighth switch tube Q8. The source S of the fifth switch tube Q5 is connected with the second end of the first inductor L1, and the drain D of the sixth switch tube Q6 connected with the source S of the fifth switch tube Q5 and the second end of the first inductor L1 respectively, the drain D of the fifth switch tube Q5 connected with the drain D of the seventh switch tube Q7, the source S of the sixth switch tube Q6 connected with the source S of the eighth switch tube Q8, and the source S of the seventh switch tube Q7 connected with the drain D of the eighth switch tube Q8 and the second end of the first capacitor C1. In the discharging process, all the fifth switch tube Q5, the sixth switch tube Q6 the seventh switch tube Q7 and the eighth switch tube Q8 are controlled to be turned on or turned off for implementing to rectify the currents of the portable energy storage power supply 100. While, in the charging process, all the fifth switch tube Q5, the sixth switch tube Q6, the seventh switch tube Q7 and the eighth switch tube Q8 are controlled to be turned on or turned off for implementing to invert the currents of the portable energy storage power supply 100. When the energy storage unit 10 is charged, a resonant frequency of the first inductor L1 and the first capacitor C1 controls switching frequencies of the fifth switch tube Q5, the sixth switch tube Q6 the seventh switch tube Q7 and the eighth switch tube Q8 for implementing the soft-switching.

The third full bridge circuit 50 includes a ninth switch tube Q9, a tenth switch tube Q10, an eleventh switch tube Q11 and a twelfth switch tube Q12. The drain D of the ninth switch tube Q9 is connected with the drain D of the seventh switch tube Q7 and the drain D of the eleventh switch tube Q11, respectively, the source S of the tenth switch tube Q10 connected with the source S of the eighth switch tube Q8 and the source S of the twelfth switch tube Q12, respectively, the source S of the ninth switch tube Q9 connected with the drain D of the tenth switch tube Q10, and the source S of the eleventh switch tube Q11 connected with the drain D of the twelfth switch tube Q12. In the discharging process, all the ninth switch tube Q9, the tenth switch tube Q10, the eleventh switch tube Q11 and the twelfth switch tube Q12 are controlled to be turned on or turned off for implementing to invert the currents of the portable energy storage power supply 100. While, in the charging process, all, the ninth switch tube Q9, the tenth switch tube Q10, the eleventh switch tube Q11 and the twelfth switch tube Q12 are controlled to be turned on or turned off for implementing to rectify the currents of the portable energy storage power supply 100.

The portable energy storage power supply 100 of the present disclosure further includes a controller a controller connected with the grid of each switch tube of the first full bridge circuit 20 the second full bridge circuit 40 and the third full bridge circuit 50.

As a specific embodiment, the energy storage unit 10 of the present disclosure is a battery pack with a 48V DC.

The discharge process is as follows: the 48V DC is inverted into an AC with a frequency of 100 kHz through the first switch tube to the fourth switch tube Q1~Q4 of the first, full bridge circuit 20, then boosted into the AC with a voltage of 240V/380V through the transformer T1, and then rectified into a DC with a voltage of 240V/380V through the fifth switch tube to the eighth switch tube Q5~Q8 of the second full bridge circuit 40, and then, the DC with a voltage of 240V/380V is inverted into an AC mains power with a voltage of 110V/220V and a frequency of 50 Hz/60 Hz through the ninth switch tube to the twelfth switch tube Q9~Q12 of the third full bridge circuit 50.

The charging process is as follows: the AC mains power with a voltage of 110V/220V and a frequency of 50 Hz/60 Hz is rectified into a DC with a voltage of 240V/380V through the ninth switch tube to the twelfth switch tube Q9~Q12 of the third full bridge circuit 50, and then inverted into an AC with a voltage of 240V/380V through the fifth switch tube to the eight switch tube Q5~Q8 of the second full bridge circuit 40, furthermore, the AC with a voltage of 240V/380V is depressurized into an AC with a voltage of 48V through the transformer T1, and then, the AC with a voltage of 48V is rectified into an DC with a voltage of 48V through the first switch tube to the fourth switch tube Q1~Q4 of the first full bridge circuit 20.

Referring to FIG. 2 and FIG. 3, the charging and discharging interface circuit 60 includes a second inductor L2, a third inductor L3, a second capacitor C2, an input-output switch 61, a charging input AC_IN, a discharging output AC_OUT, and a ground AC_N. A first end of the second inductor L2 is connected with a circuit between the ninth switch tube Q9 and the tenth switch tube Q10, a second end of the second inductor L2 connected with the input-output switch 61, and the input-output switching switch 61 also connected with the charging input AC_IN and the discharging output AC_OUT for switching between a charge state and a discharge state, a first end of the third inductor L3 connected with a circuit between the eleventh switch tube Q11 and the twelfth switch tube Q12, and a second end of the third inductor L3 connected with the ground AC_N; a first end of the second capacitor C2 connected with the second end of the second inductor L2, and a second end of the second capacitor C2 connected with the second end of the third inductor L3. The charging input AC_IN is connected with the mains network 200, the discharging output AC_OUT connected with the workload 300, and the ground AC_N is taken as a common terminal for charging and discharging. The second inductor L2, the third inductor L3, and the second capacitor C2 are configured to perform filtering on the electric energy that is input or output.

In the charging process, the mains network 200 connected with the charging input AC_IN is connected with the bidirectional portable energy storage power supply 100 by the input-output switch 61, to charge the energy storage unit 10; in the discharging process, the workload 300 connected with the discharging output AC_OUT is connected with the bidirectional portable energy storage power supply 100 by the input-output-switch 61, to discharge the energy storage unit 10.

Specifically, referring to FIG. 3, the input-output switch 61 includes a first switch JK1B and a second switch JK2B, the second end of the second inductance L2 connected with a first end of the first switch JK1B and a first end of the second switch JK2B, and a second end of the first switch JK connected with the charging input AC_IN, and a second end of the second switch JK2B connected with the discharging output AC_OUT.

The bidirectional portable energy storage power supply 100 of the present disclosure has three working modes:
firstly, when the first switch JK1B is closed and the second switch JK2B is disconnected, the energy storage power supply is configured to be as a charging mode;
secondly, when the first switch JK is disconnected and the second switch JK2B is closed, the energy storage power supply is configured to be as a discharge mode;
thirdly, when both the first switch JK1B and the second switch JK2B are closed, the energy storage power supply is configured to be as charging, and discharging mode.

In this way, the bidirectional portable energy storage power supply 100 of the present disclosure can be switched between the above three working modes to adapt for different use requirements.

It can be understood that both the first switch JK1B and the second switch JK2B are automatically and/or manually switched.

In an embodiment of the present disclosure, the first switch JK1B and the second switch JK2B are connected with a relay that is automatically switched. The controller is further connected with the relay for automatically switching the first JK1B and the second switch JK2B.

Furthermore, the bidirectional portable energy storage power supply 100 is configured as a UPS power supply by automatically switching the first switch HUB and the second switch JK2B. The conventional portable energy storage power supply does not have the function of UPS. When an input of the mains network 200 is normal, the bidirectional portable energy storage power supply 100 of the present disclosure can supply the mains power to the workload after stabilizing the mains power, and also charge the energy storage unit 10. When the mains network 200 is interrupted (due to accidental, power failures), the bidirectional portable energy storage power supply 100 of the present disclosure can immediately invert the DC energy of the energy storage unit 10 through the inverter switching method to continue to supply an AC with a voltage of 220V to the workload 300, so that the workload 300 can maintain in a normal operation and protect software and hardware of the workload from being damaged.

The bidirectional portable energy storage power supply without an adapter of the present disclosure does not need the external adapter during charging the portable energy storage power supply, so that the volume of the power supply can be minimized. At the same time, because the resonant network 30 is combined with the first full bridge circuit 20 or the second full bridge circuit 40 to implement soft-switching, switching loss in the charging and discharging process can be reduced so as to improve the electric energy conversion efficiency. Furthermore, the present disclosure provides the same circuit for charging and discharging the power supply 100, so that a charging power can be the same as a discharging power, so as to quickly charge the power supply 100, shorten the charging time and improve use experiences.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A bidirectional portable energy storage power supply without an adapter comprising an energy storage unit, a first full bridge circuit, a resonant network, a second full bridge circuit, a third full bridge circuit and a charging and discharging interface circuit connected in turn;
   each of the first full bridge circuit, the second full bridge circuit and the third full bridge circuit configured to be used as an inverter circuit or a rectification circuit, and the charging and discharging interface circuit switchably connected with a mains network and a workload; and wherein
   when the energy storage unit is discharged, the first full bridge circuit is combined with the resonant network for implementing soft-switching, to be configured to invert a low-voltage direct current (DC) of the energy storage unit into a high-frequency low-voltage alternating current (AC), and boost the high-frequency low-voltage AC into a high-voltage AC through the resonant network, and then transmit the high-voltage AC to the second full bridge circuit; the second full bridge circuit configured to rectify the high-voltage AC into a high-voltage DC, the third full bridge circuit configured to invert the high-voltage DC into a power-frequency standard voltage AC, and then output the power-frequency standard voltage AC from the charging and discharging interface circuit to the workload; and when the energy storage unit is charged, the mains network inputs the power-frequency standard voltage AC from the charging and discharging interface circuit, the third full bridge circuit configured to rectify the power-frequency standard voltage AC input from the mains network into the high-voltage DC, the second full bridge circuit combined with the resonant network for implement soft-switching, to be configured to invert the high-voltage DC into a high-frequency high-voltage AC, depressurize the high-frequency high-voltage AC into the low-voltage AC through the resonant network and transmit the low-voltage AC to the first full bridge circuit, the first full bridge circuit configured to rectify the low-voltage AC into the low-voltage DC, and the low-voltage DC input to the energy storage unit for charging the energy storage unit.

2. The bidirectional portable energy storage power supply as claimed in claim 1, wherein when the energy storage unit is discharged, a voltage of the power-frequency standard voltage AC is 110V or 220V after the third full bridge circuit has inverted the high-voltage DC into the power-frequency standard voltage AC.

3. The bidirectional portable energy storage power supply as claimed in claim 1, wherein when the energy storage unit is discharged, a frequency of the power-frequency standard voltage AC is 50 Hz or 60 Hz after the third full bridge circuit has inverted the high-voltage DC into the power-frequency standard voltage AC.

4. The bidirectional portable energy storage power supply as claimed in claim 1, wherein when the energy storage unit is charged, the third full bridge circuit is configured to rectify and boost the power-frequency standard voltage AC, with a voltage of 110V/220V and a frequency of 50 Hz/60 Hz, into the high-voltage DC, and then convert the high-voltage DC into the low-voltage DC through the second full bridge circuit, the resonant network and the first full bridge circuit, to charge the energy storage unit.

5. The bidirectional portable energy storage power supply as claimed in claim 1, wherein the energy storage unit is a battery and/or a battery pack.

6. The bidirectional portable energy storage power supply as claimed in claim 1, wherein each of the first full bridge circuit, the second full bridge circuit and the third full bridge circuit is composed of a plurality of switch tubes.

7. The bidirectional portable energy storage power supply as claimed in claim 1, wherein the resonance network comprises a transformer T1 and a resonance circuit, a low-voltage side of the transformer T1 connected with the first full bridge circuit, a high-voltage side of the transformer T1 connected with the resonance circuit, and the resonance circuit also connected with the second full bridge circuit.

8. The bidirectional portable energy storage power supply as claimed in claim 7, wherein the resonant circuit further comprises a first inductor L1 and a first capacitor C1 first end of the first inductor L1 connected with the high-voltage side of the transformer T1 a first end of the first capacitor C1 connected with the high-voltage side of the transformer T1 and connected in series with the first inductor L1, and both a second end of the first inductor L1 and a second end of the first capacitor C1 connected with the second full bridge circuit.

9. The bidirectional portable energy storage power supply as claimed in claim 8, wherein a third capacitor C3 is connected in parallel between the second full bridge circuit and the third full bridge circuit.

10. The bidirectional portable energy storage power supply as claimed in claim 7, wherein the first full bridge circuit comprises a first switch tube Q1, a second switch tube Q2, a third switch tube Q3 and a fourth switch tube Q4, the drain D of the first switch tube Q1 connected with a first end of the energy storage unit, the drain D of the second switch tube Q2 connected with the source S of the first switch tube Q1, and the source S of the second switch tube Q2 connected with a second end of the energy storage unit, the drain D of the third switch tube Q3 connected with the drain D of the first switch tube Q1 the source S of the third switch tube Q3 connected with the drain D of the fourth switch tube Q4, the source S of the second switch tube Q2 connected through the source S of the fourth switch tube Q4, the low-voltage side of the transformer T1 connected with a circuit between the first switch, tube Q1 and the second switch tube Q2, and a circuit of the third switch tube Q3 and the fourth switch tube Q4, respectively.

11. The bidirectional portable energy storage power supply as claimed in claim 10, wherein the second full bridge circuit comprises a fifth switch tube Q5, a sixth switch tube Q6, a seventh switch tube Q7 and an eighth switch tube Q8, the source S of the fifth switch tube Q5 connected with the second end of the first inductor L1, and the drain D of the sixth switch tube Q6 connected with the source S of the fifth switch tube Q5 and the second end of the first inductor L1 respectively, the drain D of the fifth switch tube Q5 connected with the drain D of the seventh switch tube Q7, the source S of the sixth switch tube Q6 connected with the source S of the eighth switch tube Q8, and the source S of the seventh switch tube Q7 connected with the drain D of the eighth switch tube Q8 and the second end of the first capacitor C1.

12. The bidirectional portable energy storage power supply as claimed in claim 11, wherein the third full bridge circuit comprises a ninth switch tube Q9, a tenth switch tube Q10, an eleventh switch tube Q11 and a twelfth switch tube Q12, the drain D of the ninth switch tube Q9 connected with the drain D of the seventh switch tube Q7 and the drain D of the eleventh switch tube Q11 respectively, the source S of the tenth switch tube Q10 connected with the source S of the eighth switch tube Q8 and the source S of the twelfth switch tube Q12 respectively, the source S of the ninth switch tube Q9 connected with the drain D of the tenth switch tube Q10, and the source S of the eleventh switch tube Q11 connected with the drain D of the twelfth switch tube Q12.

13. The bidirectional portable energy storage power supply as claimed in claim 12, wherein the charging and discharging interface circuit comprises a second inductor L2, a third inductor L3, a second capacitor C2, an input-output switch, a charging input AC_IN, a discharging output AC_OUT, and a ground AC_N; a first end of the second inductor L2 connected with a circuit between the ninth switch tube Q9 and the tenth switch tube Q10, a second end of the second inductor L2 connected with the input-output switch, and the input-output switching switch also connected with the charging input AC_IN and the discharging output AC_OUT for switching between a charge state and a discharge state, a first end of the third inductor L3 connected with a circuit between the eleventh switch tube Q11 and the twelfth switch tube Q12, and a second end of the third inductor L3 connected with the ground AC_N; a first end of the second capacitor C2 connected with the second end of the second inductor L2, and a second end of the second capacitor C2 connected with the second end of the third inductor L3.

14. The bidirectional portable energy storage power supply as claimed in claim 13, wherein the input-output switch comprises a first switch JK1B and a second switch JK2B, the second end of the second inductance L2 connected with a first end of the first, switch JK1B and a first end of the second switch JK2B, and a second end of the first switch JK1B connected with the charging input AC_IN, and a second end of the second switch JK2B connected with the discharging output AC_OUT.

15. The bidirectional portable energy storage power supply as claimed in claim 14, wherein:

when the first switch JK1B is closed and the second switch JK2B is disconnected, the energy storage power supply is configured to be as a charging mode;

when the first switch JK1B is disconnected and the second switch JK2B is closed, the energy storage power supply is configured to be as a discharge mode; and when both the first switch JK1B and the second switch JK2B are closed, the energy storage power supply is configured to be as charging and discharging mode.

16. The bidirectional portable energy storage power supply as claimed in claim 14, wherein both the first switch JK1B and the second switch JK2B are automatically and/or manually switched.

17. The bidirectional portable energy storage power supply as claimed in claim 14, wherein the first switch JK1B and the second switch JK2B are connected with a relay that, is automatically switched.

18. The bidirectional portable energy storage power supply as claimed in claim 14, wherein the bidirectional portable energy storage power supply is configured as a UPS power supply by automatically switching the first switch JK1B and the second switch JK2B.

19. The bidirectional portable energy storage power supply as claimed in claim 12, wherein the bidirectional portable energy storage power supply further comprises a controller connected with the grid of each switch tube of the first full bridge circuit, the second full bridge circuit and the third full bridge circuit.

* * * * *